United States Patent
Guo et al.

(10) Patent No.: US 8,086,841 B2
(45) Date of Patent: Dec. 27, 2011

(54) BIOS SWITCHING SYSTEM AND A METHOD THEREOF

(75) Inventors: Fu-Jyu Guo, Taipei Hsien (TW);
Tsung-Li Chuang, Taipei Hsien (TW);
Hung-Ming Liao, Taipei Hsien (TW);
Hsien-Ming Chen, Taipei Hsien (TW);
Chan-Mei Chu, Taipei Hsien (TW)

(73) Assignee: Wistron Corp., Taipei Hsien (TW)

( * ) Notice: Subject to any disclaimer, the term of this patent is extended or adjusted under 35 U.S.C. 154(b) by 376 days.

(21) Appl. No.: 12/405,415

(22) Filed: Mar. 17, 2009

(65) Prior Publication Data

US 2010/0106956 A1    Apr. 29, 2010

(30) Foreign Application Priority Data

Oct. 24, 2008   (TW) ................................ 97140824 A

(51) Int. Cl.
*G06F 9/00* (2006.01)
*G06F 12/00* (2006.01)
*G06F 11/00* (2006.01)

(52) U.S. Cl. ................ 713/2; 713/1; 711/102; 711/147; 714/6.1; 714/36

(58) Field of Classification Search .................. 713/1, 2; 711/102, 147; 714/6.1, 36
See application file for complete search history.

(56) References Cited

U.S. PATENT DOCUMENTS

| 7,451,304 | B2 * | 11/2008 | Chang et al. ...................... 713/2 |
| 7,900,036 | B2 * | 3/2011 | Abe et al. .......................... 713/2 |
| 2008/0010446 | A1 * | 1/2008 | Kim ................................. 713/2 |
| 2008/0141016 | A1 * | 6/2008 | Chang et al. ...................... 713/2 |
| 2008/0282017 | A1 * | 11/2008 | Carpenter et al. ............. 710/316 |
| 2008/0288767 | A1 * | 11/2008 | Wang et al. ....................... 713/2 |

* cited by examiner

*Primary Examiner* — Stefan Stoynov

(74) *Attorney, Agent, or Firm* — Rabin & Berdo, P.C.

(57) ABSTRACT

A BIOS switching system applicable to a computer system is provided. The BIOS switching system includes an input module and a memory module, and the memory module further includes a plurality of BIOS's, an option recording block, and a boot-up management block. The input module produces a switching signal according to a user input. The boot-up management block determines whether replacing an execution option block's data in the option recording block is necessary or not based on the switching signal. The data of the execution option block is identification data of one of the BIOS's. The boot-up management block executes the BIOS indicated by the data of the execution option block while the computer system boots up.

13 Claims, 2 Drawing Sheets

BIOS SWITCHING SYSTEM AND A METHOD THEREOF

BACKGROUND OF THE INVENTION

1. Field of the Invention

The present invention relates to a BIOS switching system and a method thereof; in particular, to a BIOS switching system with a memory unit that stores a plurality of BIOS's and a method thereof.

2. Description of Related Art

A basic input output system (BIOS) is very important for the majority of computer systems, and therefore the setting and update of a BIOS requires careful testing, so as to ensure the correct completion of the boot-up procedure. This careful testing is especially important for various computer products (such as notebook computers), and prior to leaving a factory, there will be multiple factory tests for the BIOS, so that the products will function normally once arriving at the hands of the consumers.

However during the process of testing or setting of the BIOS, errors may occur upon BIOS update, so that the BIOS can not function normally, and such a problem subsequently leads to the malfunctioning of the entire computer system. Furthermore, there may be a need to load various BIOS's with different settings during the process of BIOS testing so that these BIOS's need to be interchanged for testing. Thus, there is need for selecting and switching between multiple BIOS's.

In the prior art backup BIOS usage is described, which stores BIOS's in different storage locations within a computer system, wherein the BIOS in one storage location acts as primary BIOS, and the BIOS on the other storage location acts as backup BIOS, so that when the primary BIOS fails to function or is not operational, then the backup BIOS is read from the other storage location.

However, storing BIOS's on different storage locations increases the hardware cost of the computer system; furthermore, for the computer system of a given product that is being tested at the production line prior to leaving factory, there is need to switch between BIOS's for testing purposes, so that it is not always practical to wait for a failure before switching BIOS. The technical solutions of the prior lack flexibility in terms of practical applications.

SUMMARY OF THE INVENTION

In view of the aforementioned issues in prior art, the object of the present invention is to provide a BIOS switching system applicable to a computer system and a method thereof, so as to lower the cost for a computer system associated with a single damaged BIOS, and also to achieve flexible BIOS switching To achieve the aforementioned objects, according to an embodiment of the present invention a BIOS switching system is provided, which is applicable to a computer system, includes a memory module and an input module that generates a switching signal according to a user input. The memory module includes a plurality of BIOS's, an option recording block, and a boot-up management block. The option recording block includes an execution option block, the execution option block is for recording identification data that corresponds to one of the BIOS's, which is utilized for booting the computer; the boot-up management block according to whether or not the switching signal has been generated, replace the data of the execution option block, wherein the replacement of the data of the execution option block replaces the data of the execution option block with other identification data corresponding to another one of the BIOS's, and the boot-up management block executes the BIOS indicated by the data of the execution option block at the boot-up of the computer system, thereby completing the boot procedure of the computer system.

To achieve the aforementioned objects, according to an embodiment of the present invention, a method for a BIOS switching system is provided, which includes providing a plurality of BIOS's within a memory module, and providing an execution option block within the memory module for recording identification data that corresponds to one of the BIOS's, which is utilized for booting a computer system. The method determines whether or not a switching signal has been generated, and if the switching signal has been generated, then the computer system reads from the execution option block at the boot-up of the computer system and replaces the data of the execution option block with other identification data that corresponds to another one of the BIOS's. Finally once again the data of the execution option block is read by the boot-up management block, and the BIOS indicated by the data of the execution option block is executed.

The present invention provides a BIOS switching system and a method thereof, which according to a switching signal for the BIOS switching system, may directly select to execute one of the BIOS's within a memory module, so that there does not require extra hardware such as more than one storage device or memory; and furthermore, when one of the BIOS's is damaged or if there is need to switch between the BIOS's, the present invention ensures the ability for a normal booting procedure.

DETAILED DESCRIPTION OF THE PREFERRED EMBODIMENTS

The present invention records a plurality of BIOS's within a memory module, so that a user may switch between the BIOS's while booting a computer system according to the user's requirement at the time, thereby achieving the effect of loading various different BIOS's. In order to facilitate further understanding of the scope of the present invention, other objectives and advantages of the present invention will be set forth at length in conjunction with descriptions and appended drawings illustrated hereunder, so as to more clearly and precisely disclose the technical background and the means of the present invention.

Figure 1:
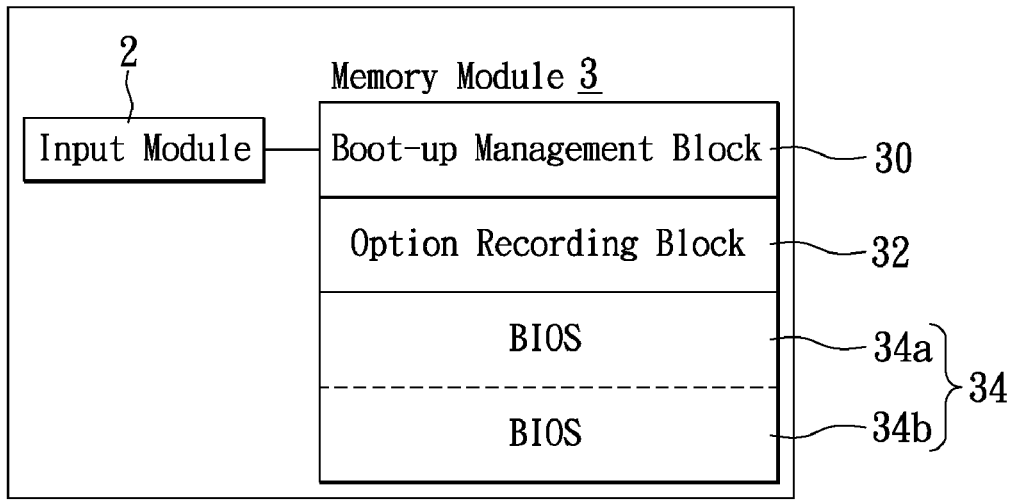
FIG. 1 shows an embodiment of a schematic diagram for a BIOS switching system according to the present invention.
Figure 2:
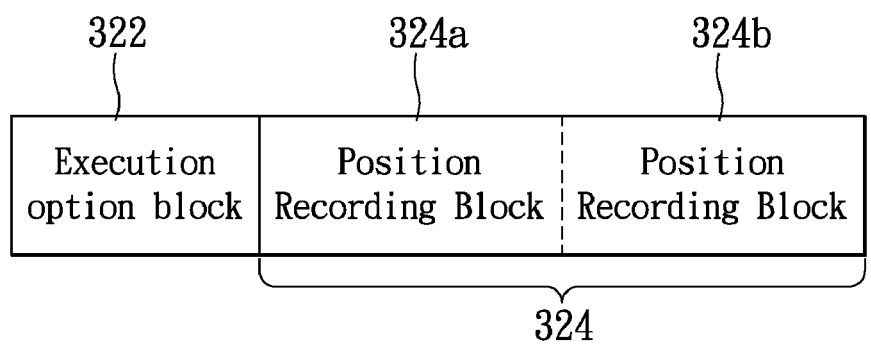
FIG. 2 shows an embodiment of a schematic diagram for an option recording block of the BIOS switching system according to the present invention.

Refer now to FIG. 1, which shows a schematic diagram of an embodiment of a BIOS switching system according to the present invention, the embodiment is applicable to a computer system 1, which includes an input module 2 and a memory module 3. The memory module 3 includes a boot-up management block 30, an option recording block 32, and a plurality of BIOS's 34, for the present embodiment two BIOS's 34 are used as an example, which are respectively BIOS 34*a* and BIOS 34*b*. Furthermore, please refer to FIG. 2 which shows a schematic diagram of an embodiment of an option recording block 32 for the BIOS switching system according to the present invention, wherein the option recording block 32 further includes an execution option block 322 and a plurality of position recording blocks 324.

The boot-up management block 30 is located at the foremost initial address location of the memory module 3, so that the command of the boot-up management block 30 which is thereby positioned at the foremost initial address location, is read and executed first at the boot-up of the computer system. Therein the command includes reading the data of the execution option block 322, and according to the data of the execution option block either the BIOS 34a or the BIOS 34b is executed. The execution option block 322 records the identification data of the BIOS's 34, so that at boot-up the computer system 1 may determine which BIOS 34 to execute from reading the identification data of the execution option block 322.

The position recording block 324 records the relative address (i.e. offset) of the BIOS's 34 within the memory module 3, for example the position recording block 324a of the present embodiment records the relative address of the BIOS 34a, and the position recording block 324b records the relative address of the BIOS 34b. In the present embodiment, the execution option block 322 records the identification data of the BIOS's 34, and the identification data is an address corresponding to the position recording block 324a or 324b within the memory module 3. When the boot-up management block 30 reads the data from the execution option block 322, the data of the execution option block 322 indicates the address of either the position recording block 324a or 324b, so that it is possible to proceed to position recording block 324a or 324b, so as to read the relative address (i.e. offset) of the BIOS 34a or 34b within the memory module 3, thereby subsequently proceed to the correct relative address as indicated indirectly by the identification data and execute one of the BIOS's 34, and complete the boot-up of the computer system 1.

The input module 2 generates a switching signal according to a user input, for example the user may click the mouse or press the keyboard's hotkey, so that through the control of an embedded controller (EC) or a keyboard controller (KBC) a high input signal may be generated, and the input signal may act as the switching signal, which is transmitted through the general purpose input/output (GPIO). The boot-up management block 30 determines whether or not the switching signal has been generated at the boot-up of the computer system 1. If the switching signal has been generated, then the boot-up management block 30 reads the data of the execution option block 322, and also replaces the data of the execution option block 322. For the present embodiment, the specific procedure may be the following: the boot-up management block 30 reads the execution option block 322 on which the address of position recording block 324a is recorded, and at this time the switching signal has been determined to have been generated, so that the boot-up management block further replaces the data of the execution option block 322. The replacement is done via replacing the data of the execution option block 322 through writing back the address of position recording block 324b into the execution option block 322, which is then saved. Now the boot-up management block 30 may once again read the data of the execution option block 322 which now has been renewed, and via the data as indicated now in the execution option block 322, the boot-up management block 30 proceeds to the address of the position recording block 324b. Then the boot-up management block 30 reads the data of the position recording block 324b which contains the relative address (i.e. offset) of the BIOS 34b within the memory module 3, so as to proceed to the relative address and execute the BIOS 34b.

Of course, if the boot-up management block 30 determined that there has not been a switching signal generated at boot-up, then the boot-up management block 30 reads directly from the execution option block 322 which contains the original data, and executes the BIOS's 34 as indicated by the execution option block 322, wherein in the present embodiment the BIOS 34a is the one indicated.

In the present embodiment, the utilized memory module 3 is a flash memory, furthermore the flash memory may be a serial peripheral interface (SPI) flash memory which has the trend of increasing memory capacity, and due to this trend of increasing memory capacity and low power consumption, SPI flash memory is very suitable for use as a storage for the BIOS's 34. When the SPI flash memory is utilized within the computer system 1, no additional storage device or memory is required to separately store the BIOS's 34, furthermore as explained above, switching between a plurality of BIOS's 34 according to a user requirements may be achieved, for example the needs to switch between BIOS's for product testing purpose, or when a BIOS is damaged then another BIOS may be switched to for boot-up, so as to maintain normal operation of the computer system 1.

Figure 3:
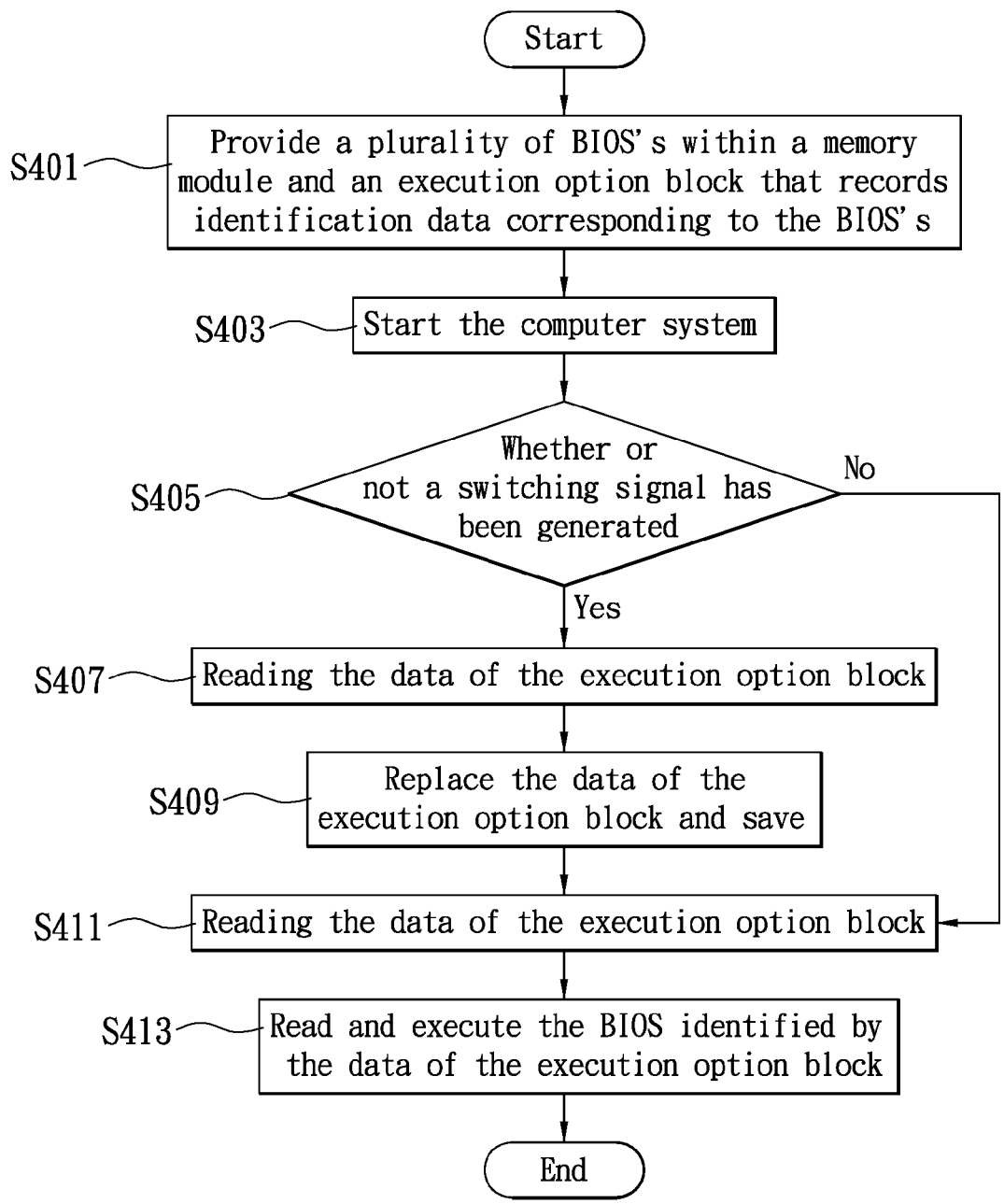
FIG. 3 shows a flow chart of a method for a BIOS switching system according to the present invention

FIG. 3 shows a flow chart of a method for a BIOS switching system according to the present invention, which includes the following steps: first, provide a plurality of BIOS's 34 within a memory module 3, and providing an execution option block 322 within the memory module 3 for recording identification data that corresponds to one of the BIOS's 34, which is utilized for booting a computer system (S401); next boot-up the computer system 1 (S403), and at the boot-up of the computer system 1, the boot-up management 30 of the memory module 3 is the first to execute and determine whether or not a switching signal has been generated and received for switching the BIOS's 34 (S405), as an example, the switching signal may be generated via a user's operation of an input module 2, such as a click of a mouse or the key of a keyboard, which generates a high input signal that acts as the switching signal to be transmitted through the GPIO.

If a switching signal has been generated, then read from the execution option block 322 of the option recording block 32 of the memory module 3 (S407), the execution option block 322 records identification data of one of the BIOS's 34, wherein the identification data is for identifying which BIOS's 34 to execute; next replace the data of the execution option block 322 that was read by switching to another identification corresponding to another BIOS's 34, and then save the replaced data to the execution option block 322 (S409). Using two BIOS's 34 as specific example as shown in FIG. 1, then S409 may be described specifically as renewing by replacing the identification data of BIOS 34a that is recorded in the execution option block 322, with the identification data of the BIOS 34b. Next, back to general description of the flow chart, read the data of the execution option block 322 (S411), the data of the execution option block 322 indicates the updated identification data, and according to this identification data, execute the BIOS's 34 as indicated by this identification data (S413), for the present embodiment, this means reading the identification data of BIOS 34b, and execute the BIOS 34b.

On the other hand, if the boot-up management block 30 determines (S405) there has not been a switching signal generated, that means the user does not require switching the BIOS's 34, so that the data of the execution option block 322 may be read directly (S411), and according to the original data without identification data update, execute the BIOS's 34 as indicated by the identification data (S413), for the present embodiment, that means execute the BIOS 34*a*.

Therein, the identification data for the BIOS's 34 recorded within the execution option block 322 is the address of the position recording block 324 within the memory module 3, and the position recording block 324 records the relative address (i.e. offset) of the BIOS's 34 within the memory module 3, for example the position recording block 324*a* records the relative address of the BIOS 34*a*, position recording block 324*b* records the relative address of the BIOS 34*b*. So that when the boot-up management block 30 reads the data of the execution 322 according to the foremost initial command, the recorded address of a position recording block 324 is read, then proceed to the position recording block 324 as indicated by the address, so as to read the relative address of the BIOS's 34 within the memory module 3 that is recorded within the position recording block 324, then finally proceed according to the relative address to read and execute the indicated BIOS's 34.

A memory module 3 that is suitable for the present embodiment may be a flash memory module composed of serial peripheral interface (SPI) flash memory, by taking advantage of the technical characteristic that SPI flash memory has an increasing tread of memory increase, a plurality of BIOS's 34 may exist within different memory block of a single flash memory, so as to provide a plurality of BIOS's 34 for the boot-up of a computer system 1 without increasing hardware cost, thereby when a BIOS 34 fails to function normally another BIOS 34 may be utilized for normal operation.

For the aforementioned embodiments, even though the switching of BIOS is only explained in terms of two BIOS's, but the present invention is not limited to storing two BIOS's within a flash memory, according to the requirement of the computer system operation, there may also be three or more BIOS's provided for switching. Furthermore there may be different combinations of input module control, such as utilizing different key combination to output different switching signal, so as to decide which BIOS to switch to for use, thereby allow a user to flexibly decide which BIOS to load at the boot-up of a computer system.

As described above, the present invention has clearly described the recording of a plurality of BIOS's within a memory module, and may achieve the effect of selecting between the BIOS's at the boot-up of a computer system according to user requirements, so that without the need of additional hardware such as more than one storage device or memory, the present invention may flexibly provide different BIOS's for operation, so as to prevent having one damaged BIOS from affecting the operation of the computer system.

The present invention has been disclosed through the preferred embodiments thereof as set forth hereinbefore, but those skilled in the art can appreciate that such embodiments simply provide illustrations of the present invention, rather than being interpreted as limiting the scope thereof. It is noted that all effectively equivalent changes, modifications, and substitutions made to those disclosed embodiments are deemed to be encompassed within the scope of the present invention. Therefore, the scope of the present invention to be legally protected should be delineated by the following claims.

What is claimed is:

1. A basic input output system (BIOS) switching system applicable to a computer system, comprising:
    an input module, for generating a switching signal according to a user input; and
    a memory module, comprising:
        a plurality of basic input output systems, including a first BIOS and a second BIOS;
        an option recording block, which includes an execution option block for recording identification data that corresponds to a position of the first BIOS for identifying the first BIOS, which is used for booting the computer, and a plurality of position recording blocks for respectively recording relative offsets for the basic input output systems within the memory module; and
        a boot-up management block which, according to whether or not the switching signal has been generated, renews the identification data of the execution option block, wherein renewing the identification data of the execution option block replaces the identification data of the execution option block with identification data corresponding to a position of the second BIOS for identifying the second BIOS, and the boot-up management block executes the second BIOS indicated by the identification data of the execution option block when the computer system boots up.

2. The BIOS switching system according to claim 1, wherein when the computer system boots up, whether or not the switching signal has been generated is determined before the identification data of the execution option block is renewed if the switching signal has been generated.

3. The BIOS switching system according to claim 1, wherein the input module is a keyboard or a mouse.

4. The BIOS switching system according to claim 1, wherein the memory module is a flash memory.

5. The BIOS switching system according to claim 4, wherein the memory module is a serial peripheral interface (SPI) flash memory.

6. A method for a basic input output system (BIOSE) switching system applicable to a computer system, comprising the following steps:
    preparing a plurality of basic input output systems within a memory module, each of the basic input output system being associated with an identification data corresponding to a position of the basic input output system for identifying the basic input output system, and providing an execution option block within the memory module for recording the identification data that corresponds to a first BIOS of the basic input output systems, which is utilized for booting the computer system, with the identification data corresponding to the first BIOS stored in a first position recording block of the execution option block for recording a relative offset of the first BIOS;
    determining whether or not a switching signal has been generated;
    if the switching signal has been generated, causing the computer system to read from the execution option block when the computer system boots up, and renewing the identification data of the execution option block according to identification data that corresponds to s a second BIOS of the basic input output systems with the identification data corresponding to the second BIOS stored in a second position recording block of the execution option block for recording a relative offset of the second BIOS; and
    causing the computer system to read the identification data of the execution option block corresponding to the second BIOS, and executing the second BIOS indicated by the identification data of the execution option block corresponding to the second BIOS.

7. The method for the BIOS switching system according to claim 6, after determining whether or not a switching signal has been generated, further comprising:

when the switching signal has not been generated, reading the identification data from the execution option block, and executing the first BIOS indicated by the identification data of the execution option block.

8. The method for the BIOS switching system according to claim 7, wherein reading from the execution option block, and executing the first BIOS or the second BIOS indicated by the data of the execution option block further comprises:

according to the identification data recorded by the execution option block, reading from the first position recording block or the second position reading block; and proceeding to the first BIOS or the second BIOS according to the relative offset so as to read and execute the BIOS.

9. The method for the BIOS switching system according to claim 6, wherein the switching signal is generated according to a user's operation of an input module.

10. The method for the BIOS switching system according to claim 9, wherein the input module is a keyboard or a mouse.

11. The method for the BIOS switching system according to claim 6, wherein whether or not the switching signal has been generated is determined when the computer system boots up.

12. The method for the BIOS switching system according to claim 6, wherein the memory module is a flash memory.

13. The method for the BIOS switching system according to claim 12, wherein the memory module is a serial peripheral interface (SPI) flash memory.

* * * * *